US005531070A

United States Patent [19]

Berger et al.

[11] Patent Number: 5,531,070

[45] Date of Patent: Jul. 2, 1996

[54] DIESEL ENGINE REVERSE START INHIBIT

[75] Inventors: John G. Berger, Landisville, Pa.; Edward H. Priepke, Lancaster; Peter J. Torland, Mt. Joy, all of Pa.

[73] Assignee: New Holland North America, Inc., New Holland, Pa.

[21] Appl. No.: 348,898

[22] Filed: Nov. 25, 1994

[51] Int. Cl.$^{6}$ .............................. F16D 31/00; F02B 77/00

[52] U.S. Cl. ................................ 60/327.000; 60/431.000; 123/198 DB; 123/357.000; 123/397.000

[58] Field of Search ............................ 60/327, 431, 432; 123/359, 198 DB, 397, 198 D

[56] References Cited

U.S. PATENT DOCUMENTS

| | | | |
|---|---|---|---|
| 4,180,979 | 1/1980 | Cornell | 60/431 X |
| 4,555,762 | 11/1985 | Ohgami et al. | 123/198 DBX |
| 4,565,170 | 1/1986 | Grieshaber et al. | 123/198 DBX |
| 4,785,771 | 11/1988 | Ibuki et al. | 123/359 X |
| 4,966,113 | 10/1990 | Fujimoto | 123/359 |
| 5,388,562 | 2/1995 | Sekiguchi et al. | 123/359 X |

FOREIGN PATENT DOCUMENTS

| | | | |
|---|---|---|---|
| 5010201 | 1/1993 | Japan | 123/359 |

*Primary Examiner*—Hoang Nguyen
*Attorney, Agent, or Firm*—Griffin, Butler Whisenhunt & Kurtossy

[57] ABSTRACT

A front end loader driven by a diesel engine is prevented from starting in reverse after stalling under load conditions which might place a backload on the engine. A speed sensor senses engine speed and the output of the sensor is applied to a programmable controller that controls a fuel flow solenoid. The controller compares the engine speed with a first reference speed in approximately the range of the idle speed of the engine until the engine speed is greater than the first reference speed. The controller then compares the engine speed with a second reference speed value less than the engine idle speed. If the engine speed drops below the second reference speed value, indicating an impending engine stall, the microprocessor controls the fuel flow solenoid to stop flow of fuel to the engine so that the engine stops. Since the engine is without fuel it cannot restart even if backloaded. A method of operating the diesel engine is also disclosed.

6 Claims, 2 Drawing Sheets

Fig. 1
PRIOR ART
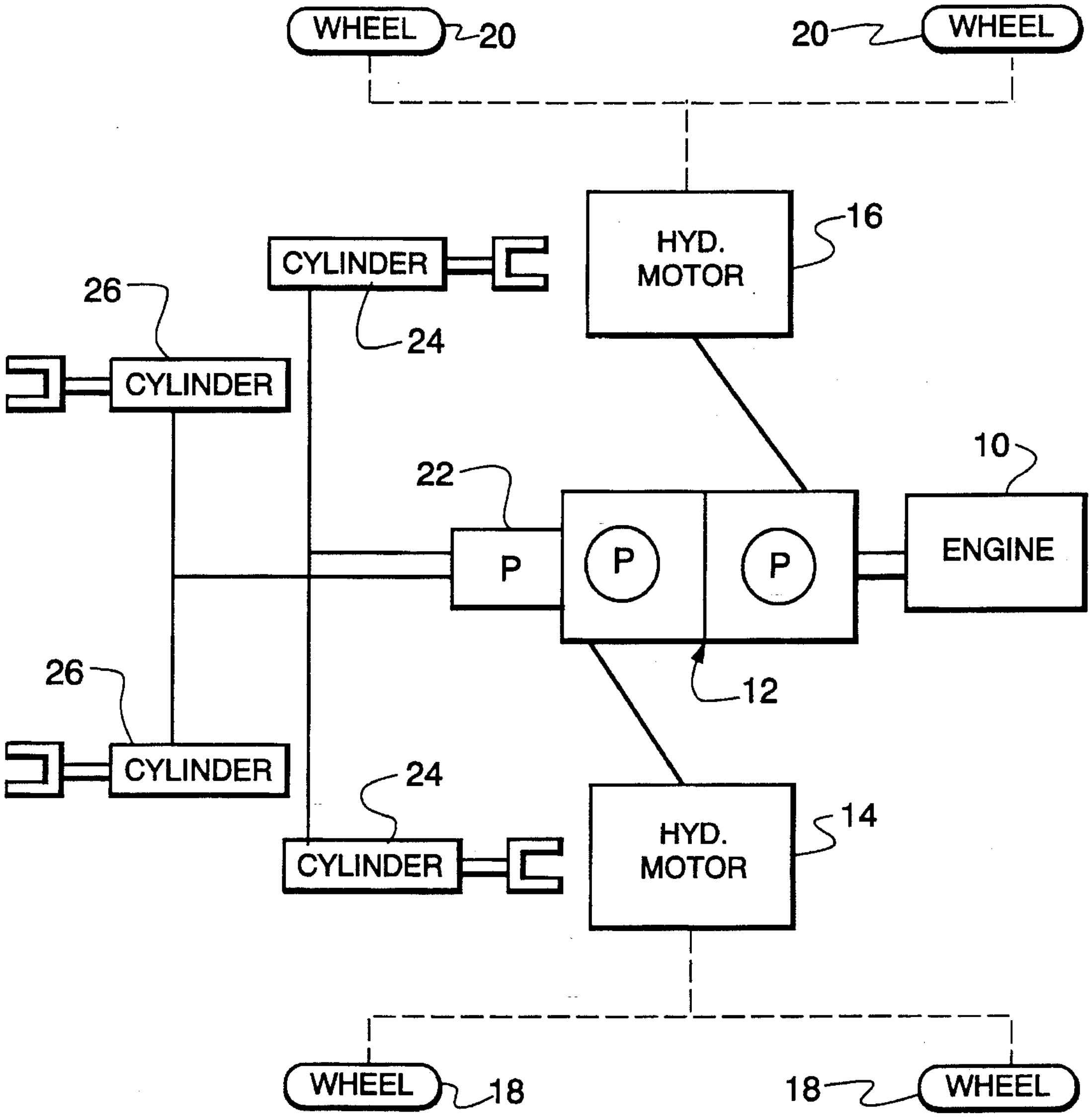
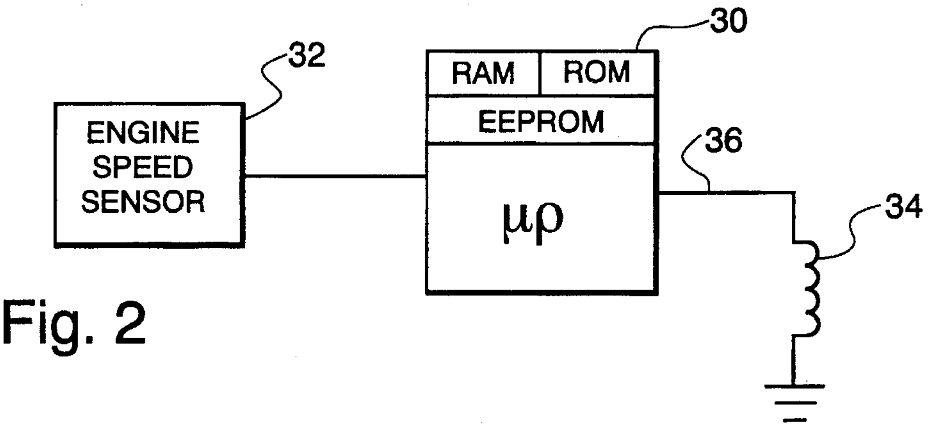
Fig. 2

DIESEL ENGINE REVERSE START INHIBIT

RELATED APPLICATIONS

This application incorporates by reference the disclosure of the concurrently filed and commonly owned application of John Berger, et al., Ser. No. 03/348,910 entitled Security and Safety Interlocks for a Loader.

FIELD OF THE INVENTION

The present invention relates to a method and apparatus for preventing a diesel engine from restarting in the reverse direction in the event the engine is stalled under conditions which place a backload on the engine. More particularly, the invention provides a method and apparatus for preventing the diesel engine of a skid-steer loader from restarting in the reverse direction if the loader drifts backward down an incline after the engine is stalled.

BACKGROUND OF THE INVENTION

FIG. 1 schematically illustrates a skid-steer loader having a diesel engine 10 driving two hydrostatic pumps 12 that pump hydraulic fluid to two hydrostatic motors 14 and 16. Motor 14 drives the wheels 18 on the left side of the loader and the motor 16 drives the wheels 20 on the right side. Right and left hand levers (not shown) enable an operator to vary the flow of hydraulic fluid to the motors 14 and 16 to thereby separately control the direction and rate of rotation of the wheels on each side of the loader. The engine also drives a gear pump 22 that supplies hydraulic fluid to boom cylinders 24 to raise and lower a boom (not shown) and to cylinders 26 to tilt a bucket (not shown) carried by the boom. A loader of the type shown in FIG. 1 is disclosed in the publication Operator's Manual, Skid-Steer Loader L565, LX565, LX665, Ford New Holland, Inc. (1993).

Experience has shown that certain types of diesel engines produced by some manufacturers present a problem when used in a loader as shown in FIG. 1 in that they may, if stalled under conditions of heavy backload, spontaneously restart in the reverse direction. This may occur, for example, if the loader is moving up an incline with a heavy load in the bucket, the operator "lugs" the engine so that it stalls, and the loader begins to drift backwardly down the incline. If the operator keeps the hand levers in the forward (higher forward speed) direction the energy of the wheels is coupled back to the engine through the motors 14 and 16, which now act as pumps, and the pumps 12, which now act as motors to drive the engine in the reverse direction. Because the engine is hot, the compression caused by the reverse drive causes fuel. ignition and the engine starts in reverse.

If the engine runs in the reverse direction, the air filter may be damaged in only a few seconds. Furthermore, the operator may adversely react if the loader moves unexpectedly in reverse.

SUMMARY OF THE INVENTION

An object of the invention is to provide a method and apparatus for preventing a diesel engine from restarting in the reverse direction when there is a strong likelihood that a stall will soon occur.

A further object of the invention is to provide a method for controlling a diesel engine of a type which may restart in reverse if stalled under conditions which place a backload on the engine, the method comprising sensing the speed of the engine to detect an impending engine stall, and stopping the flow of fuel to the engine; before it stalls so that the engine can not restart.

Another object of the invention is to provide an improvement in a front end loader having a diesel engine driving hydrostatic; pumps that provide fluid under pressure to drive hydrostatic motors which drive wheels of the loader, an engine speed sensor, a fuel control means for controlling the flow of fuel to the engine, and a controller producing an output signal to enable the fuel control means so that fuel flows to the engine, the improvement being characterized in that the controller comprises first comparing means responsive to the speed sensor for comparing the speed of the: engine with a first reference speed value representing an engine: speed in the range the idle speed of the engine when it is warm, second comparing means responsive to the speed sensor for comparing the speed of the engine with a second reference speed value: representing an engine speed less than the engine idle speed, means responsive to the first comparing means for enabling the second comparing means once the sensed engine speed is greater than the: first reference speed value, and means responsive to the second comparing means for terminating the output signal to the fuel control means when the engine speed is not greater than the second reference speed value, whereby the flow of fuel to the engine is stopped.

Other objects of the invention and the manner of making and using it will become obvious from consideration of the following description and the accompanying drawings.

BRIEF DESCRIPTION OF THE DRAWINGS

FIG. 1 schematically illustrates the engine and wheel drive for a skid-steer loader;

FIG. 2 shows a portion of the electrical system for a loader for controlling the fuel flow solenoid; and, FIG. 3 is a flow diagram of a portion of a program executed by the controller of FIG. 2 so as to shut off the flow of fuel to a diesel engine when the engine speed drops so low as to indicate an impending engine stall.

DESCRIPTION OF A PREFERRED EMBODIMENT

Figure 3:
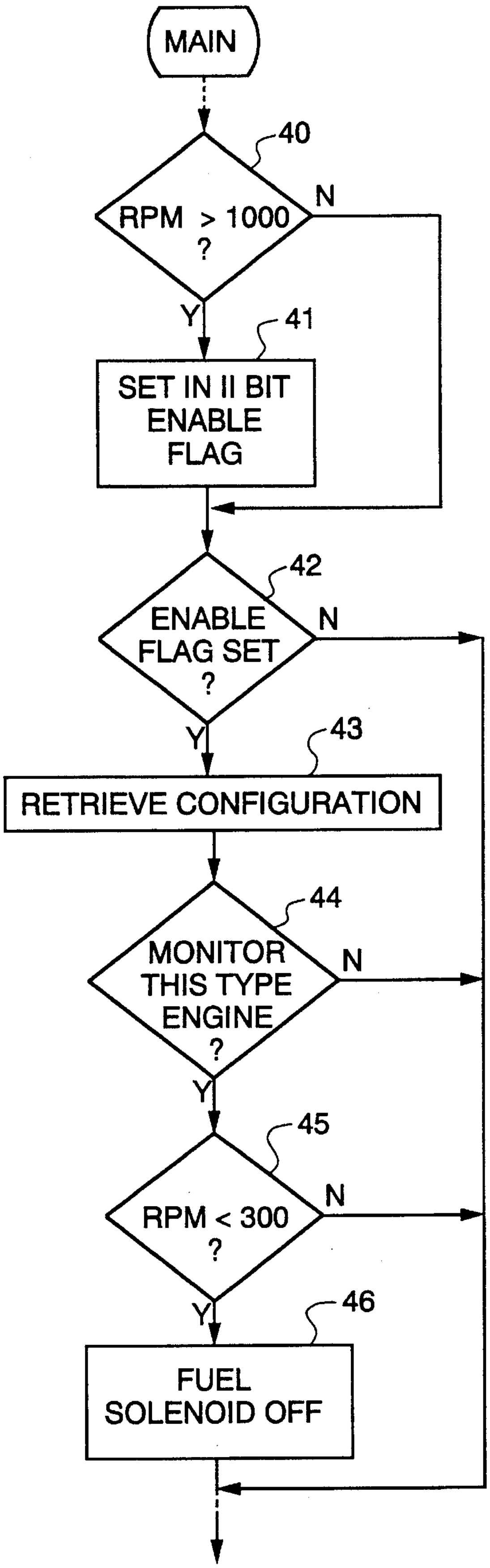

FIG. 2 shows a portion of the electrical system for a front end loader of the type shown in FIG. 1. Only those elements of the electrical system relevant to the present invention are shown. These elements include a controller 30, an engine speed sensor 32 and a fuel control solenoid 34. The above-referenced concurrently filed application shows and describes in detail the operation of the electrical system to start the loader engine and control the fuel control solenoid 34 so as to allow fuel flow to the engine.

The controller 30 may be a Motorola type MC68HC11A1FN microprocessor having RAM, ROM and EEPROM memories. The speed sensor 32 may be any conventional device for sensing the rotational speed of the engine 10 of FIG. 1 and may, for example, be an electrical alternator driven by the engine 10. The fuel control solenoid serves as a fuel control means for controlling the flow of fuel from a fuel pump (not shown) to the engine cylinders. The fuel control solenoid either allows full fuel flow or completely stops fuel flow. A throttle control lever in the operator's cab controls the rate of fuel flow and thus controls the engine speed.

As explained in detail in the application referenced above, the microprocessor 30 may begin execution of a Main routine as soon as an operator sits in the operator's seat. The Main routine is interrupted every 4.1 ms by an RTI routine which, once the engine is started, sets an output signal on lead 36 to keep the solenoid 34 energized so that fuel may flow to the engine.

The Main routine is repeated every 32.77 ms. FIG. 3 shows that portion of the Main routine relevant to the present invention. At step 40, the microprocessor gets the engine speed from sensor 32 and compares the engine speed with a first reference speeded value. The first reference speed value is chosen to represent an engine speed approximately equal to the idle speed of the engine 10 after it has warmed up. In this regard, the normal procedure in starting the engine is to set the throttle lever to an "idle" position which will result in an engine speed of about 900–1000 RPM when the engine starts. The value 1000 is not critical and any'engine speed in the range of the normal idle speed, or even slightly above the idle speed may be used. The purpose of step 40 is to prevent the reverse start inhibit feature from becoming active to shut off fuel flow during engine start-up or while the engine is still cold and running at less than normal warm idle speed. As long as the engine speed is less than 1000 RPM, the comparison at step 40 proves false and the routine jumps to step 42 where an INHIBIT ENABLE flag is tested. This flag is cleared during initialization when the microprocessor is first powered up so it will still be reset when execution of the Main routine begins. Therefore, the test at step 42 will initially prove false and the routine branches around steps 43–46 and continues with operations forming no part of the present invention.

Steps 40 and 42 are repeated every 32.77 ms as long as the engine speed does not exceed 1000 RPM. When the engine warms up or the operator moves the throttle to increase the engine speed above 1000 RPM, the test at step 40 will prove true. The routine advances to step 41 where the INHIBIT ENABLE flag is set. The program advances to step 42 where the INHIBIT ENABLE flag is tested. Since the flag is now set, the test proves true and at step 43 the microprocessor retrieves a configuration code from non-volatile memory.

The assignee of this application markets different models of front end loaders having different engines and other different physical characteristics. A single type of Electronic Instrument Cluster (EIC) including a microprocessor like the microprocessor 30, is used to monitor the status of the loaders, display various monitored functions, and perform certain control functions. To enable a single type of EIC to be used with loaders having different configurations, a configuration code is stored in the EEPROM memory at the factory. Control parameters for the various configurations are also stored in this memory. When the microprocessor reaches a point in its program where the action to be taken is dependent on the characteristics of a specific loader, the microprocessor accesses the configuration code and either determines from the configuration code the action to be taken or uses the configuration code to access the stored parameter for the specific type of loader specified by the configuration.

The configuration code specifies, among other things, information as to the source and type of the engine in the loader. Step 43 retrieves the configuration code from the EEPROM and step 44 analyzes the configuration code to determine if the engine in the loader is of one of the types which might restart in reverse if backloaded at the time of a stall. If step 44 determines that the engine in the loader is not one of a type which is capable of restarting in reverse, the routine branches around steps 45 and 46 and continues with other operations. In this case the reverse start inhibit feature is never activated. On each execution of the main routine steps 40–44 will be executed as long as the engine speed is above 1000 RPM and if the engine speed drops below 1000 RPM, or stalls, steps 40 and 42–44 are executed.

If the analysis of the configuration code at step 44 should determine that the loader engine is one of a type that may restart in reverse then step 45 is executed to compare the sensed engine speed with a second reference speed value representing an engine speed much less than the engine idle speed. In the preferred embodiment the second reference speed value is 300 RPM since, for the types of engines known to be capable of spontaneously restarting, the speed will drop to 300 RPM only if a stall is impending.

As long as the engine speed remains above 300 RPM the test at step 45 proves false and the routine branches around step 46 and continues with other activities. Therefore, as long as the engine speed is above 1000 RPM steps 40–45 of the Main routine are carried out repetitively but if the speed drops below 1000 RPM steps 40 and 42–46 are carried out.

If the operator should lug the engine, that is, create conditions such that more power is required from the engine than it is able to deliver for the throttle setting, the speed of the engine will drop. If the overloading is severe enough to reduce the engine speed below 300 RPM then there is a likelihood that the engine will stall. In this case the comparison at step 45 will detect that the engine speed has dropped below 300 RPM, indicating an imminent engine stall. The microprocessor then terminates the signal on lead 36 (step 46). When the signal is terminated the fuel control solenoid 34 is de-energized thereby blocking the flow of fuel to the engine so the engine stops. Since the engine lacks fuel, it cannot spontaneously restart even if subjected to severe back loading.

From the foregoing description it is seen that the present invention provides a simple and inexpensive way of preventing spontaneous reverse restarting of a diesel engine. Since most loaders already have the controller 30, speed sensor 32 and fuel control solenoid 34, no additional hardware is required. The invention may be implemented merely by adding a few additional steps to the program executed by the microprocessor.

Although the invention has been described with reference a specific preferred embodiment, it will be understood that various substitutions and modifications may be made in the described embodiment without departing from the spirit and scope of the invention as defined by the appended claims. For example, the first and second reference speed values are not critical. The first reference speed value need only be high enough to insure that the restart inhibit feature is not enabled until the engine is started and idling. Both the first and second reference speed values may vary depending on the particular make and model of the engine being controlled. In this regard, if the microprocessor is to be used with engines for which the first and/or second reference speed should differ, the routine of FIG. 3 may be modified to select the correct reference speed values from the EEPROM through use of the configuration code. Furthermore, the invention is not limited to use in controlling loader engines but may be used to prevent a diesel engine from restarting in reverse regardless of the load it is driving.

We claim:

1. A method for preventing a diesel engine from restarting in reverse when an engine stall, under conditions which might place a backload on the engine, is imminent, said method comprising:

providing a fuel control means for controlling the flow of fuel to the engine;

comparing the sensed engine speed with a first reference speed value having a fixed magnitude representing a speed in approximately the range of the idle speed of the engine;

comparing the sensed engine speed with a second reference speed value having a fixed magnitude representing a second speed less than the idle speed of the engine only after a comparison of the sensed engine speed with said first reference value indicates that the engine speed has exceeded said first reference speed value; and, controlling said fuel control means to stop the flow of fuel to said engine when the sensed engine speed is less than said second reference speed value.

2. Apparatus for preventing a diesel engine from restarting in reverse when an engine stall, under conditions which might place a backload on the engine, is imminent, said engine having fuel control means for controlling the flow of fuel to said engine, said apparatus comprising:

a speed sensor for sensing the speed of the engine;

a memory for storing a first reference speed value and a second reference speed value, said first reference speed value having a first fixed magnitude representing a speed in approximately the range of the idle speed of said engine and said second reference speed value having a second fixed magnitude representing a second speed less than the idle speed of said engine; and, a controller responsive to said speed sensor and including, first comparing means for comparing the sensed engine speed with said first reference speed value;

second comparing means for comparing the sensed engine speed with said second reference speed value; and, means responsive to said first comparing means for enabling said second comparing means only after said first comparing means determines that said sensed engine speed is greater than said first reference speed value; and, means responsive to said second comparing means for controlling said fuel control means to stop the flow of fuel to said engine when the sensed engine speed is less than said second reference speed value.

3. Apparatus for preventing a diesel engine from restarting in reverse when an engine stall, under conditions which might place a backload on the engine, is imminent, said engine having fuel control means for controlling the flow of fuel to said engine, said apparatus comprising:

a speed sensor for sensing the current speed of the engine;

a controller responsive to said speed sensor and including, first comparing means for comparing the sensed current speed of the engine with a first reference speed value representing a speed in approximately the range of the idle speed of said engine;

second comparing means for comparing the sensed current speed of the engine with a second reference speed value representing a second speed less than the idle speed of said engine; and, means responsive to said first comparing means for enabling said second comparing means when said sensed current engine speed is greater than said first reference speed value; and, means responsive to said second comparing means for controlling said fuel control means to stop the flow of fuel to said engine when the sensed engine speed is less than said second reference speed value.

4. Apparatus as claimed in claim 3 wherein said controller comprises a programmable microprocessor having a non-volatile memory, said first reference speed value and said second reference speed value being stored in said non-volatile memory.

5. Apparatus as claimed in claim 3 wherein said speed sensor is an alternator driven by said engine.

6. Apparatus as claimed in claim 3 wherein said engine drives hydrostatic pumps that provide hydraulic fluid under pressure to hydrostatic motors which drive wheels of a loader.

* * * * *